United States Patent
Cho

(10) Patent No.: US 9,632,314 B2
(45) Date of Patent: Apr. 25, 2017

(54) HEAD MOUNTED DISPLAY DEVICE DISPLAYING THUMBNAIL IMAGE AND METHOD OF CONTROLLING THE SAME

(71) Applicant: LG ELECTRONICS INC., Seoul (KR)

(72) Inventor: Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

(21) Appl. No.: 14/323,639

(22) Filed: Jul. 3, 2014

(65) Prior Publication Data
US 2015/0331242 A1   Nov. 19, 2015

(30) Foreign Application Priority Data

May 19, 2014 (KR) ......................... 10-2014-0059494

(51) Int. Cl.
| | | |
|---|---|---|
| G02B 27/01 | (2006.01) | |
| H04N 5/265 | (2006.01) | |
| G06T 7/00 | (2017.01) | |
| G02B 27/00 | (2006.01) | |

(52) U.S. Cl.
CPC ....... G02B 27/017 (2013.01); G02B 27/0101 (2013.01); G02B 27/0172 (2013.01); G06T 7/004 (2013.01); H04N 5/265 (2013.01); G02B 27/0093 (2013.01); G02B 2027/014 (2013.01); G02B 2027/0187 (2013.01)

(58) Field of Classification Search
None
See application file for complete search history.

(56) References Cited

U.S. PATENT DOCUMENTS

| | | | |
|---|---|---|---|
| 8,965,460 B1* | 2/2015 | Rao | G06F 3/005 455/566 |
| 2003/0197785 A1* | 10/2003 | White | G11B 27/034 348/207.99 |
| 2004/0179104 A1 | 9/2004 | Benton | |
| 2009/0172543 A1 | 7/2009 | Cronin et al. | |
| 2011/0050848 A1* | 3/2011 | Rohaly | G06T 15/10 348/43 |
| 2014/0191929 A1 | 7/2014 | Kim | |

FOREIGN PATENT DOCUMENTS

| | | |
|---|---|---|
| JP | 2012-8290 A | 1/2012 |
| KR | 10-2006-0099274 A | 9/2006 |
| KR | 10-2014-0010715 A | 1/2014 |

* cited by examiner

*Primary Examiner* — Nicholas Lee
*Assistant Examiner* — Duane N Taylor, Jr.
(74) *Attorney, Agent, or Firm* — Birch, Stewart, Kolasch & Birch, LLP

(57) ABSTRACT

A head mounted display (HMD) device and a method of controlling the same are disclosed. The method includes displaying a surround video image included in surround video content, displaying a partial region of the surround video image in the front direction of the HMD device, setting a first thumbnail image corresponding to a first viewing region of a first surround video image, displaying a second viewing region of the first surround video image at a first playing time, and setting a second thumbnail image corresponding to the second viewing region at the first surround video image, wherein the first thumbnail image and the second thumbnail image are each set to correspond to the same first playing time.

18 Claims, 14 Drawing Sheets

AFTER PLAYING OF
SURROUND VIDEO CONTENT

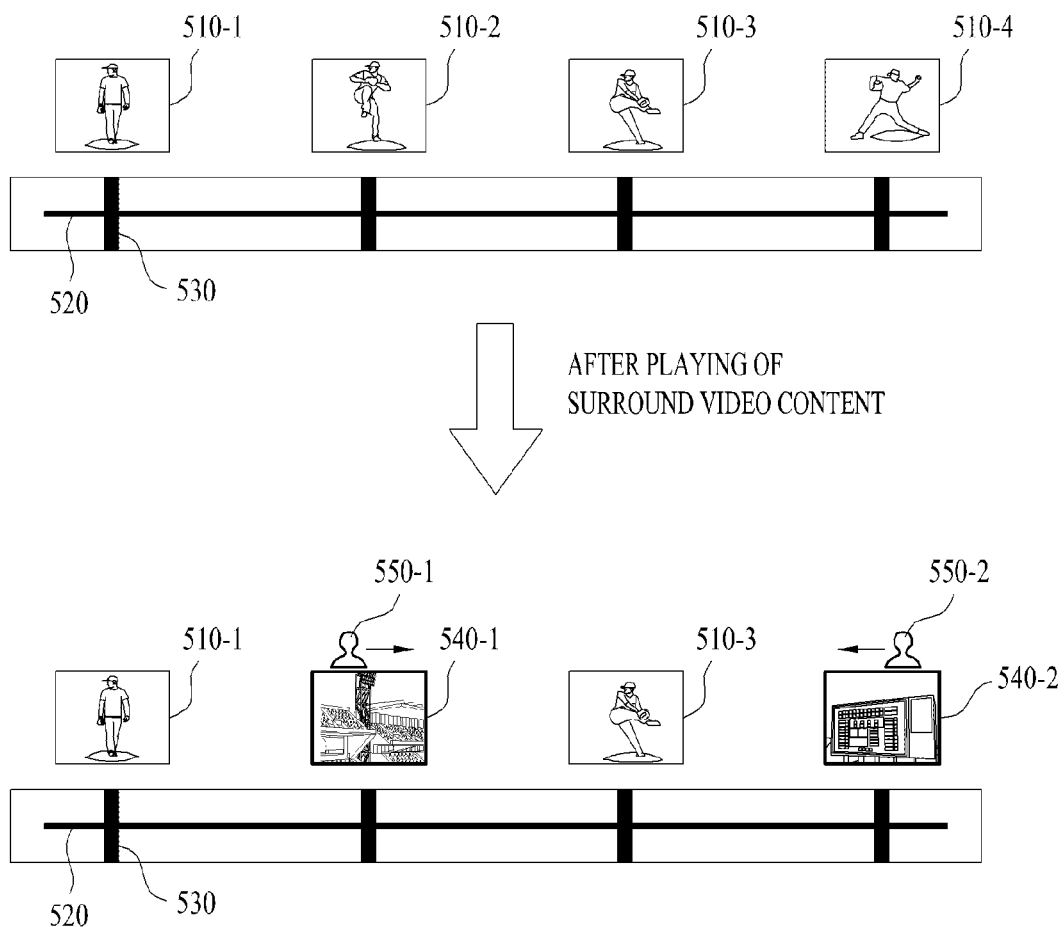

AFTER PLAYING OF
SURROUND VIDEO CONTENT

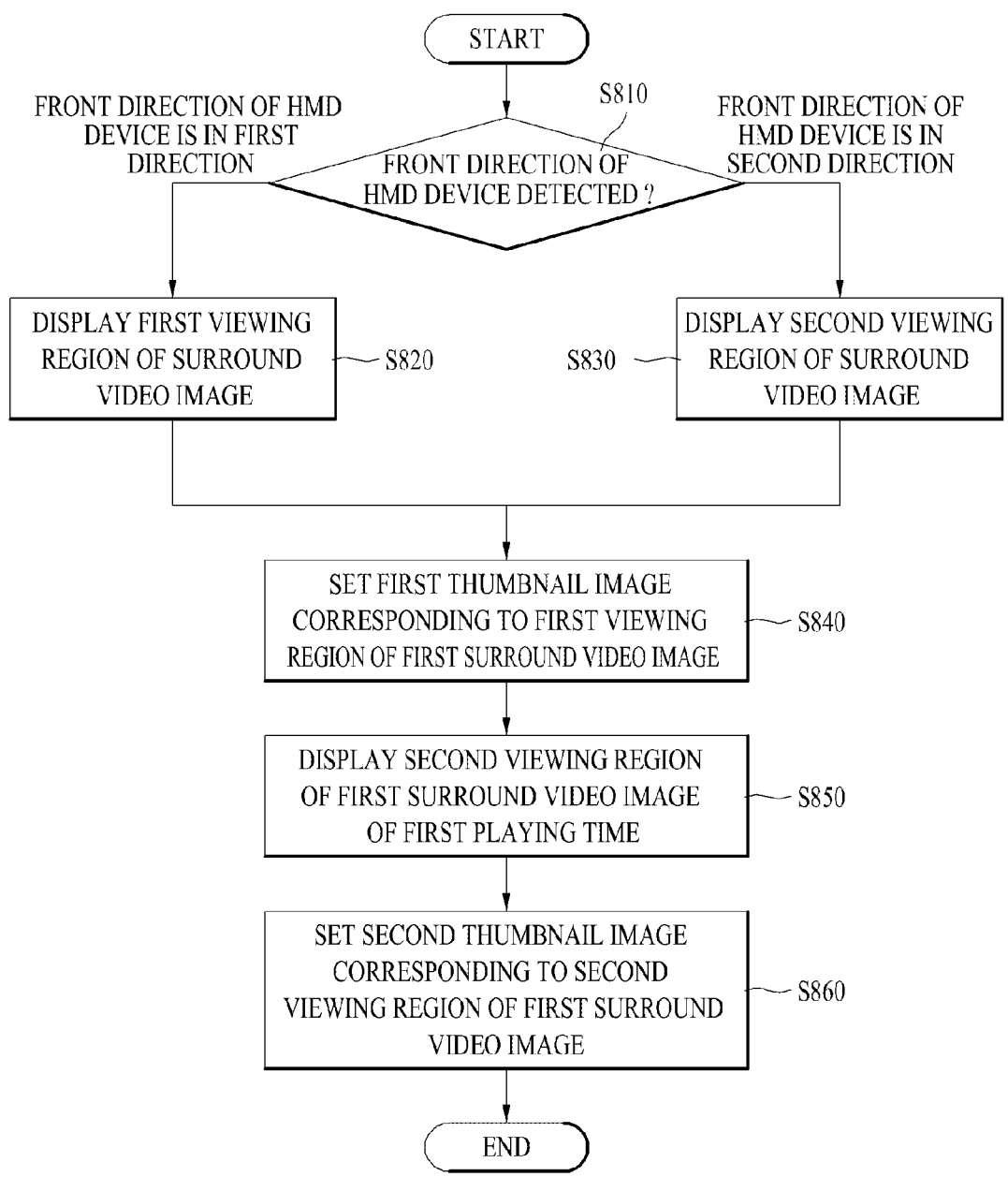

HEAD MOUNTED DISPLAY DEVICE DISPLAYING THUMBNAIL IMAGE AND METHOD OF CONTROLLING THE SAME

This application claims the benefit of Korean Patent Application No. 10-2014-0059494, filed on May 19, 2014, which is hereby incorporated by reference as if fully set forth herein.

BACKGROUND OF THE INVENTION

Field of the Invention

The present specification relates to a head mounted display device and a method of controlling the same.

Discussion of the Related Art

A head mounted display (HMD) device can provide a real image or a virtual image to a user. In this case, the HMD device may differently set an image provided to the user according to a front direction of the HMD device. In more detail, when the user views surrounding images using the HMD device, the user can view other real images around the HMD device according to a gaze direction of the user. Similarly, when the user views a virtual image using the HMD device, the HMD device may provide different images to the user according to a front direction of the HMD device.

In addition, the HMD device may play video content including a virtual image. In this case, the video content may include a video image corresponding to time information. The HMD device may display a progress bar indicating a progress of the video content. In addition, the HMD device may display a thumbnail image associated with the video image on the progress bar.

When the HMD device displays the progress bar and the thumbnail image, the HMD device requires a method of displaying the thumbnail image in consideration of images provided according to a front direction of the HMD device.

SUMMARY OF THE INVENTION

Accordingly, the present specification is directed to a head mounted display (HMD) device and a method of controlling the same that substantially obviate one or more problems due to limitations and disadvantages of the related art.

An object of the present specification is to provide a head mounted display device and a method of controlling the same, for displaying a thumbnail image.

According to an embodiment of the present specification, an HMD device sets a thumbnail image based on a displayed region of a surround video image.

According to an embodiment of the present specification, the present specification, an HMD device displays a surround video image to correspond to a playing time in surround video content.

According to an embodiment of the present specification, an HMD device displays a screen image including at least one of a partial region of a surround video image, a thumbnail image, and a progress bar.

According to an embodiment of the present specification, an HMD device displays a thumbnail image and an indicator.

According to an embodiment of the present specification, an HMD device displays a thumbnail image based on image attributes.

According to an embodiment of the present specification, an HMD device displays a partial region of a surround video image based on control input for selection of a thumbnail image.

According to an embodiment of the present specification, an HMD device displays a thumbnail image based on positional information of the HMD device.

In addition, according to an embodiment of the present specification, an HMD device displays a progress map indicating a moving path of the HMD device.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a head mounted display (HMD) device includes a sensor unit configured to detect a front direction of the HMD device, a display unit configured to display a surround video image included in surround video content, to display a partial region of the surround video image in the front direction of the HMD device, to display a first viewing region of the surround video image when the front direction of the HMD device is in a first direction, and to display a second viewing region of the surround video image when the front direction of the HMD device is in a second direction, and a processor configured to control the sensor unit and the display unit, wherein the processor sets a first thumbnail image corresponding to a first viewing region of a first surround video image, displays a second viewing region of the first surround video image at a first playing time, and sets a second thumbnail image corresponding to the second viewing region at the first surround video image, and the first thumbnail image and the second thumbnail image are each set to correspond to the same first playing time.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIGS. 5A to 5D are illustrating a method of displaying a thumbnail image after an HMD device plays surround video content according to an embodiment of the present specification;

FIG. 8 is a flowchart of a method of controlling an HMD device according to an embodiment of the present specification.

DETAILED DESCRIPTION OF THE INVENTION

Reference will now be made in detail to the preferred embodiments of the present specification, examples of which are illustrated in the accompanying drawings.

Most of the terms used herein are general terms that have been widely used in the technical art to which the present specification pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present specification.

A head mounted display (HMD) device according to the present specification may provide an image to a user. In more detail, a HMD device 100 may provide an image to a user who wears the HMD device 100.

Figure 1:
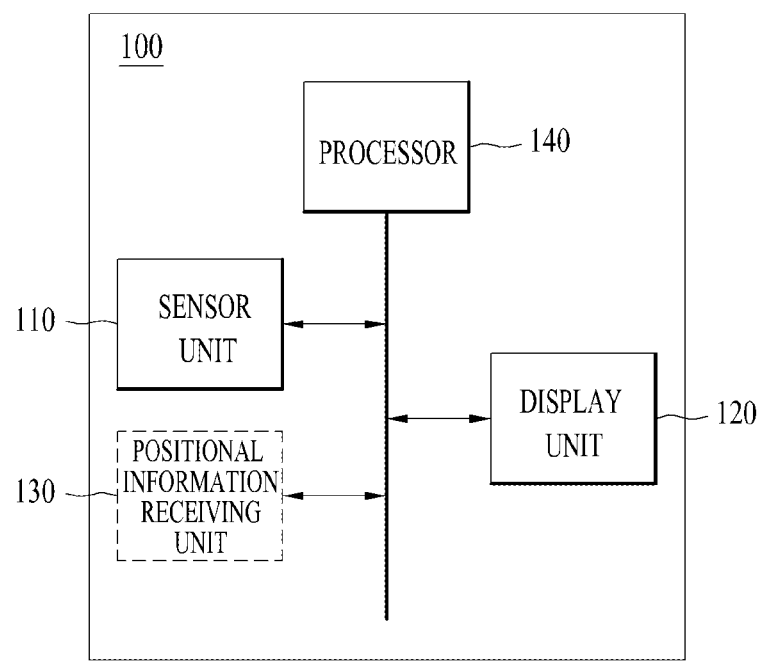
FIG. 1 is a block diagram of a head mounted display (HMD) device according to an embodiment of the present specification.

FIG. 1 is a block diagram of the HMD device 100 according to an embodiment of the present specification. The HMD device 100 may include a sensor unit 110, a display unit 120, and a processor 140. In addition, the HMD device 100 may further include a positional information receiving unit 130.

The sensor unit 110 may detect a front direction of the HMD device 100. In this case, the front direction of the HMD device 100 may be a direction toward the user who wears the HMD device 100. In more detail, the front direction of the HMD device 100 may be a direction that is changed based on movement of the user who wears the HMD device 100 and may be determined based on the HMD device 100. That is, the front direction of the HMD device 100 may be a direction in which the user views an image while wearing the HMD device 100. In addition, the HMD device 100 may set a reference direction for the front direction of the HMD device 100 and detect change in the front direction of the HMD device 100. For example, the HMD device 100 may set, as the reference direction, a direction in which the user views an image at a point in time when the user wears the HMD device 100. In this case, when the user who wears the HMD device 100 turns or moves his or her head, the HMD device 100 may detect change in the front direction of the HMD device 100 based on the reference direction.

The HMD device 100 may play surround video content including a surround video image. In this case, the HMD device 100 may set, as the reference direction, the front direction of the HMD device 100 at a point in time when the surround video content is first played. For example, when the user wears the HMD device 100 and surround video content for movie watching is played, the HMD device 100 may set, as the reference direction, the front direction of the HMD device 100 at a point in time when the user plays surround video content. In this case, when the user turns or moves his or her head, the HMD device 100 may detect change in the front direction of the HMD device 100 based on the reference direction. That is, change in the front direction of the HMD device 100 may be detected based on the reference direction. In addition, the reference direction may be set to be changed by the user or the HMD device 100 without being limited thereto In addition, the sensor unit 110 may detect control input and transmit the detected control input to the processor 140. In this case, the control input may be input for control of the HMD device 100. In more detail, the control input may be input for control of a surround video image, a thumbnail image, and a progress bar that are displayed on the HMD device 100. In this case, the sensor unit 110 may detect at least one of gesture input, touch input, voice input, and input from an input device as the control input. In addition, the sensor unit 110 may include at least one of a touch sensor, a proximity sensor, a gyro sensor, an acceleration sensor, a gravity sensor, and a voice sensor without being limited thereto.

The aforementioned sensors may be separate elements included in the HMD device 100 or may be integrated as at least one element included in the HMD device 100.

The display unit 120 may display a surround video image. In this case, the display unit 120 may display the surround video image. In this case, the surround video image may refer to visually recognizable information, such as an image, a text, a moving picture, a photo, a picture, etc. Upon displaying the surround video image, the HMD device 100 may display a partial region of the surround video image based on the front direction of the HMD device 100, which will be described with reference to FIGS. 2A to 2C. In addition, the surround video image may be an image corresponding to time information. In more detail, the surround video image may be included in surround video content and may be an image corresponding to time information of the surround video content. For example, the surround video content may be a captured image, a movie, etc. That is, the surround video content may include a plurality of surround video images, and each surround video image may be displayed to correspond to time information.

In addition, the display unit 120 may display a screen image to correspond to a playing time in the surround video content. In this case, for example, the display unit 120 may display at least one of a progress bar, a thumbnail image, and a partial region of the surround video image, corresponding to the playing time. In this case, the progress bar may indicate a progress based on time information of the surround video image in the surround video content. For example, the progress bar may display an indicator at a position corresponding to a playing time of the surround video image. In this case, the progress bar may display a partial region of the surround video image based on the playing time of the position in which the indicator is positioned. In addition, the HMD device 100 may display a progress map, which will be described with reference to FIGS. 7A and 7B. In addition, the thumbnail image may be an image corresponding to the surround video image. In more detail, the thumbnail image may be an image obtained by reducing the surround video image by a reference ratio. In addition, the thumbnail image may be an image associated with the surround video image and may be a representative image of the surround video image. In addition, the display unit 120 may display the thumbnail image adjacent to a position corresponding to the playing time of the progress bar.

That is, the HMD device 100 may display a screen image to correspond to the playing time in the surround video content.

The positional information receiving unit 130 may receive positional information of the HMD device 100. In this case, for example, the positional information receiving unit 130 may include a global positioning system (GPS) and receive the positional information of the HMD device 100 through a satellite. In addition, the positional information receiving unit 130 may be a unit that receives the positional information of the HMD device 100 using a local area network or eNB information. That is, the positional information receiving unit 130 may be a unit that receives positional information of the HMD device 100 without being limited thereto.

In this case, the positional information receiving unit 130 may periodically receive and acquire positional information of the HMD device 100. The HMD device 100 may detect a moving path of the HMD device 100 using the positional information of the HMD device 100, which is periodically acquired.

The positional information receiving unit 130 may receive the positional information used by the HMD device 100 without being limited thereto.

The processor 140 may set a first thumbnail image corresponding to a first viewing region of a first surround video image. In this case, the processor 140 may set the first thumbnail image as a representative image of the first surround video image. For example, the first viewing region may be displayed when the front direction of the HMD device 100 is a front direction of a user. For example, the first viewing region may be displayed when the front direction of the HMD device 100 is the aforementioned reference direction. For example, the first viewing region may be a representative image of the first surround video image.

The processor 140 may display a second viewing region of the first surround video image at a first playing time. In this case, the first playing time may be a point in time corresponding to time information contained in the surround video content. When the surround video content is played, the processor 140 may display the second viewing region of the first surround video image at the first playing time. In this case, the second viewing region may be displayed based on the front direction of the HMD device 100.

When the second viewing region of the first surround video image is displayed at the first playing time, the processor 140 may set a second thumbnail image corresponding to the second viewing region. In this case, each of the aforementioned first thumbnail image and second thumbnail image may be a thumbnail image corresponding to the same first playing time. In more detail, the processor 140 may display a thumbnail image associated with the surround video image and a progress bar indicating a progress of the surround video image. In this case, the processor 140 may set the first surround video image, the first thumbnail image, and the second thumbnail image to correspond to the same first playing time and may selectively display the first surround video image, the first thumbnail image, and the second thumbnail image.

Figure 2A:
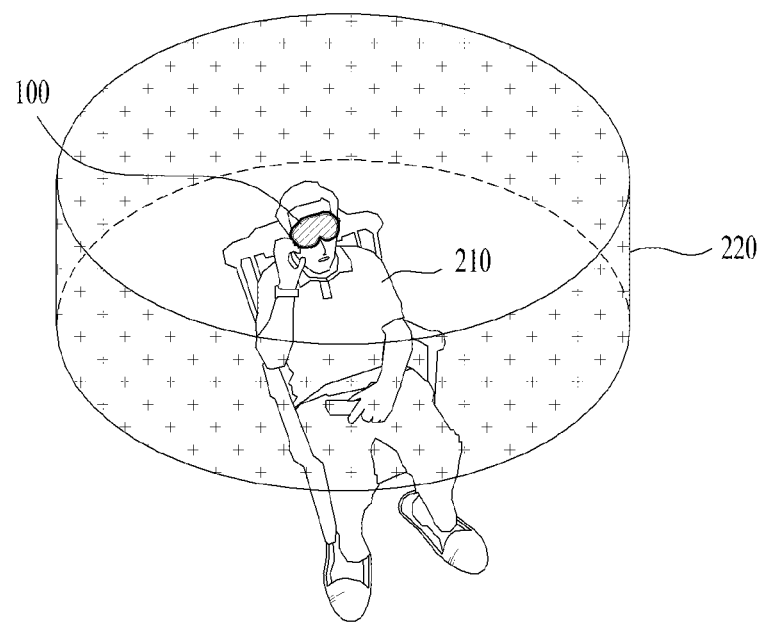
FIGS. 2A to 2C are diagrams illustrating an image type of a surround video image according to an embodiment of the present specification.
Figure 2B:
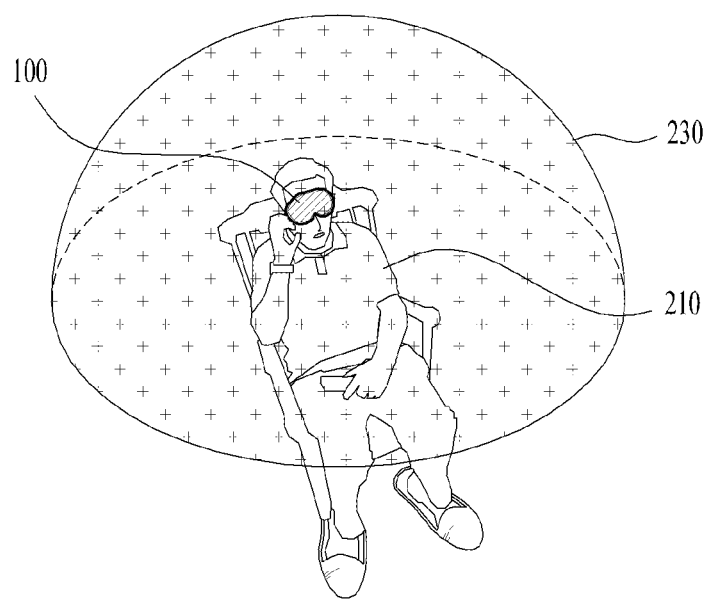
Figure 2C:
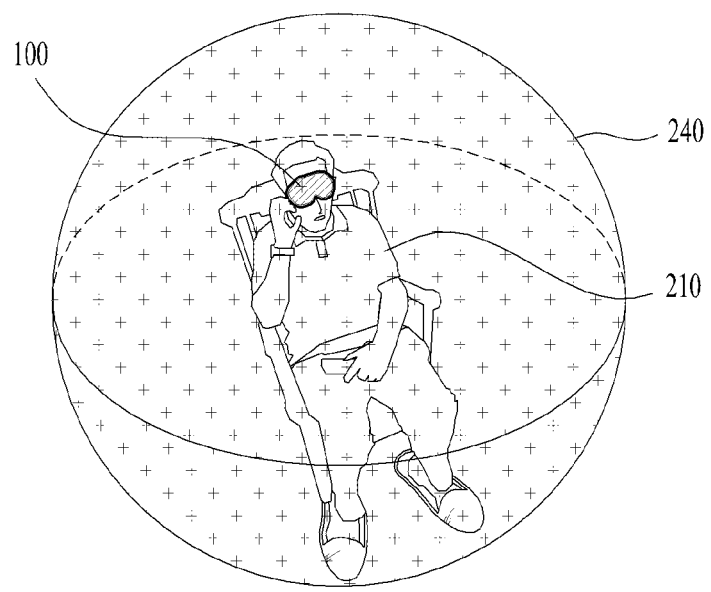

FIGS. 2A to 2C are diagrams illustrating an image type of a surround video image according to an embodiment of the present specification.

The HMD device may detect a front direction of the HMD device using the sensor unit 110. As mentioned in the foregoing description, the HMD device 100 may detect the front direction of the HMD device 100 based on a reference direction. In this case, the HMD device 100 may display a part of a surround video image based on the front direction of the HMD device 100.

In this case, the surround video image may correspond to an image unfolded to a prescribed direction (e.g., a front, a rear, a left, a right, a top, or a bottom direction) on the basis of the HMD device 100. In particular, the HMD device 100 detects a direction at which a face of a user is facing as the front direction of the HMD device 100 and may be then able to provide a surround video image corresponding to the direction to the user. By doing so, the HMD may provide a more realistic virtual environment to the user.

Additionally, the HMD device 100 may display a surround video image based on an image type of the surround video image. In this case, as an example, the image type may be determined based on a region which is displayed according to the front direction of the HMD device 100. More specifically, the HMD device 100 may display a part of the surround video image in a prescribed direction on the basis of the HMD device 100.

As an example, referring to FIG. 2a, the surround video image may correspond to a cylinder image type 220 which provides an image to all directions of a horizontal direction of the HMD device 100. In this case, the HMD device 100 may form the surround video image for bearings of 360 degrees in horizontal direction from the front of the HMD device 100. In particular, the surround video image may correspond to an image of a cylinder form when the surround video image is seen from external.

Additionally, as an example, referring to FIG. 2b, the surround video image may correspond to a hemisphere image type 230 which provides an image to all directions of a horizontal direction and all directions of a vertical direction above a horizontal plane of the HMD device 100. In this case, the HMD device 100 may provide the surround video image to the bearings of 360 degrees in horizontal direction from the front of the HMD device 100. Additionally, the HMD device 100 may provide the image to all directions above the horizontal plane of the HMD device 100. In particular, the surround video image may correspond to an image of a hemisphere form when the surround video image is seen from external.

Additionally, as an example, referring to FIG. 2c, the surround video image may correspond to a sphere image type 240 which provides an image to all directions of a horizontal direction and all directions of a vertical direction of the HMD device 100. In this case, the HMD device 100 may provide the surround video image to the bearings of 360 degrees in horizontal direction from the front of the HMD device 100. Additionally, the HMD device 100 may provide the surround video image to the bearings of 360 degrees in vertical direction from the front of the HMD device 100. In particular, the surround video image may correspond to an image of a sphere form when the surround video image is seen from external.

In particular, the image type of the surround video image may be determined based on a region in which the image is displayed in the horizontal direction or the vertical direction of the front direction of the HMD device 100. The surround video image may correspond to a video image which is modified according to the front direction of the HMD device 100, by which the present specification may be non-limited. In particular, if the front direction of the HMD device 100 changes, the HMD device 100 may display a part of the surround video image for the user. In this case, the HMD device 100 may display regions different from each other of the surround video image in accordance with the front direction of the HMD device 100.

Figure 3:
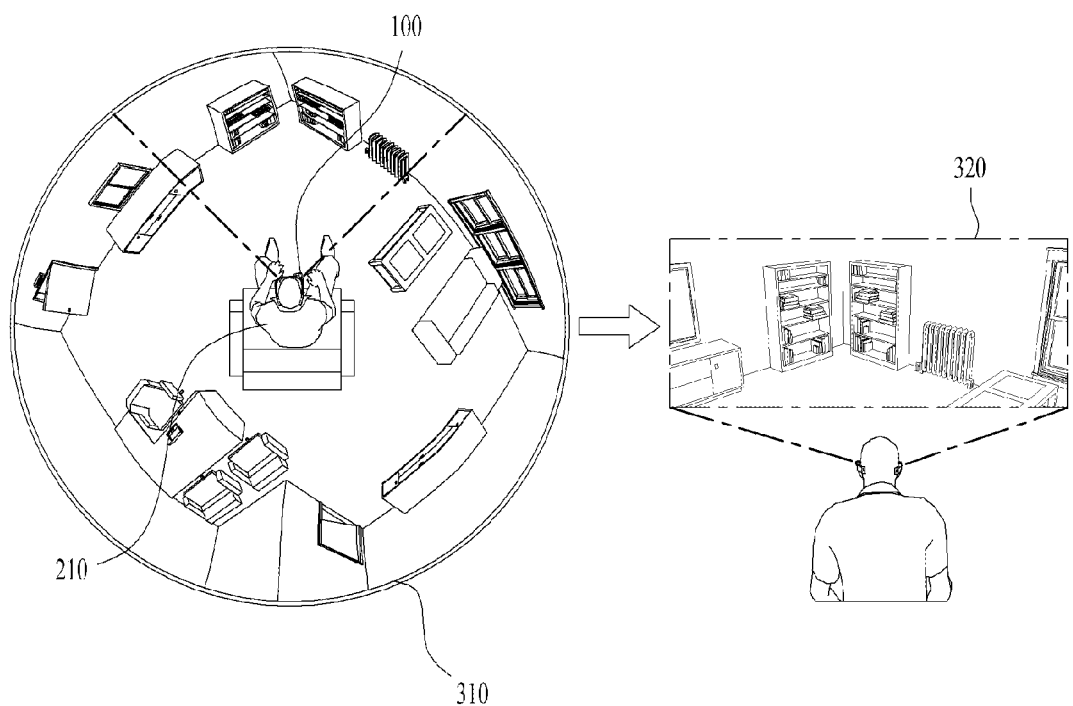
FIG. 3 is a diagram illustrating a displayed region of a surround video image according to a front direction of an HMD device according to an embodiment of the present specification.
Figure 3:
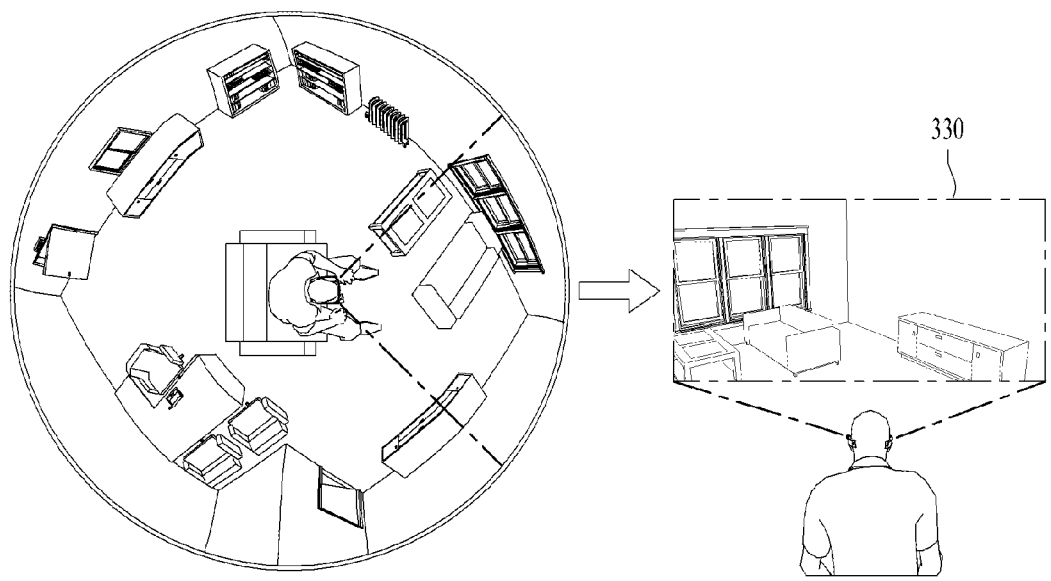

FIG. 3 is a diagram illustrating a displayed region of a surround video image according to a front direction of the HMD device 100 according to an embodiment of the present specification.

If the front direction of the HMD device 100 corresponds to a first direction, the HMD device 100 may display a first region 320. If the front direction of the HMD device 100 corresponds to a second direction, the HMD device 100 may display a second region 330.

More specifically, the HMD device 100 may display a part of a surround video image 310 based on the front direction of the HMD device 100. In this case, as mentioned in the foregoing description, the HMD device 100 may detect the front direction of the HMD device 100 based on a reference direction. Additionally, as an example, the reference direction may correspond to a front direction of a user on timing that the HMD device 100 displays the surround video image 310. The HMD device 100 may detect that the front direction of the HMD device 100 corresponds to the first direction. In this case, the HMD device 100 may display the first region 320 corresponding to the first direction among the surround video image 310. As an example, the HMD device may set up the reference direction corresponding to the front direction of the user as the first direction when the HMD device 100 displays the surround video image 310. In this case, the HMD device 100 may display the first region 320 corresponding to the first direction. Subsequently, the HMD device 100 may detect that the front direction of the HMD device 100 changes from the reference direction to a second direction. In this case, as an example, the second direction may correspond to a direction that the user turns the user's head to 90 degrees from the reference direction. The HMD device 100 may display the second region 330 corresponding to the second direction. In particular, the HMD device 100 may display a part of the surround video image 310 in response to the front direction of the HMD device 100.

Figure 4:
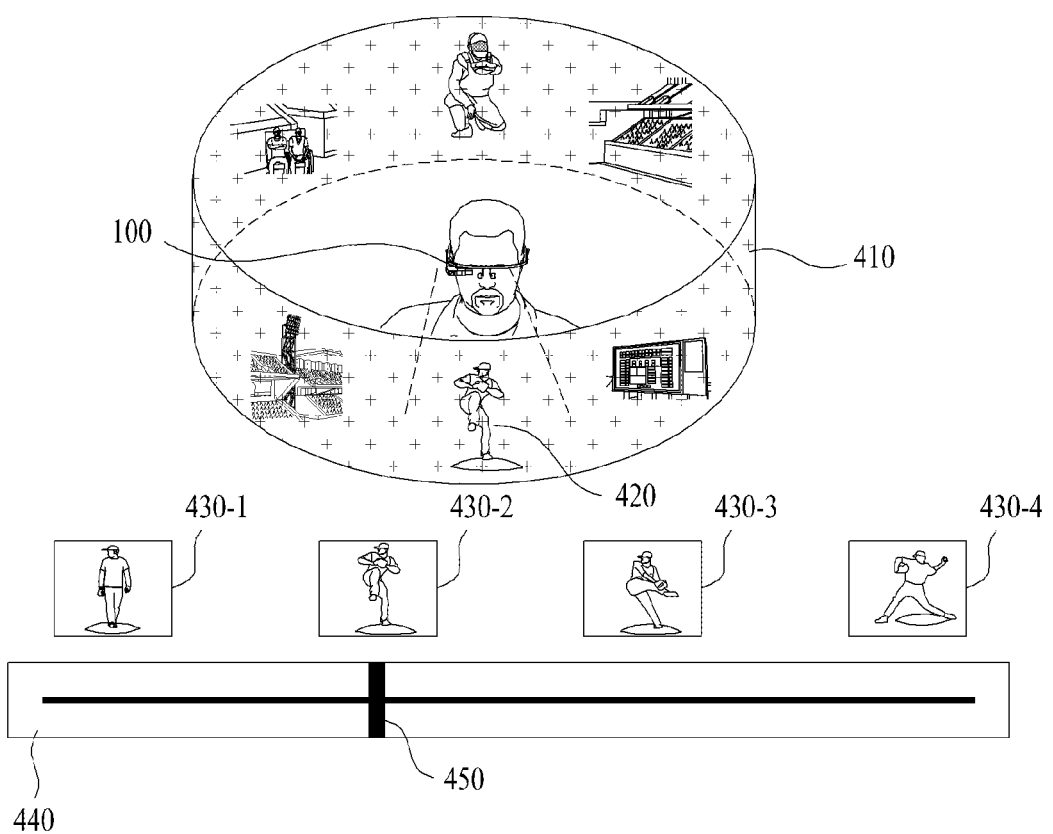
FIG. 4 is a diagram illustrating a method of displaying thumbnail images of surround video images by the HMD device 100 according to an embodiment of the present specification.

FIG. 4 is a diagram illustrating a method of displaying thumbnail images of surround video images by the HMD device 100 according to an embodiment of the present specification.

The HMD device 100 may play surround video content. In this case, the surround video content may be used to display a plurality of surround video images to correspond to playing time. In addition, when the surround video content is played, the HMD device 100 may display a screen image to correspond to each playing time in the surround video content. As described above, the screen image may at least one of a partial region of the surround video image, a thumbnail image, and a progress bar. In this case, when the HMD device 100 displays a progress bar, the HMD device 100 may display an indicator 450 on the progress bar based on the playing time in the surround video content. In addition, when the HMD device 100 displays the thumbnail image, the HMD device 100 may display one thumbnail image adjacent to the indicator 450 corresponding to the playing time. In addition, for example, the HMD device 100 may simultaneously display a plurality of thumbnails without being limited thereto.

In addition, when the HMD device 100 displays a thumbnail image, the HMD device 100 may detect control input for selection of a thumbnail image. In this case, the control input may be touch input, gesture input, or input from an input device without being limited thereto. When the HMD device 100 detects control input for selection of a thumbnail image, the HMD device 100 may display a partial region of the surround video image, corresponding to the thumbnail image, on a screen image. In this case, for example, when the HMD device 100 displays a plurality of thumbnail images, the HMD device 100 may detect control input for selection of the thumbnail image. The HMD device 100 may display a partial region of the surround video image, corresponding to a thumbnail image selected among a plurality of thumbnail images.

For example, referring to FIG. 4, when the surround video content is played, the HMD device 100 may display a first surround video image 410 at a first playing time. In this case, the HMD device 100 may detect the front direction of the HMD device 100 and provide a partial region 420 of a first surround video image, corresponding to the front direction, to a user. In addition, for example, the HMD device 100 may display the indicator 450 corresponding to the first playing time on a progress bar 440. In addition, the HMD device 100 may display a first thumbnail image 430-2 adjacent to the indicator 450. In this case, the first thumbnail image 430-2 may correspond to the same first playing time as the first surround video image 410.

For example, when the HMD device 100 displays a thumbnail image, the HMD device 100 may display a plurality of thumbnail images 430-1, 430-2, 430-3, and 430-4 at respective positions corresponding to playing time on the progress bar 440 without being limited thereto.

FIGS. 5A to 5D are illustrating a method of displaying a thumbnail image after the HMD device 100 plays surround video content according to an embodiment of the present specification.

As described above, the HMD device 100 may display the surround video image and then set a thumbnail image based on a displayed region of the surround video image. The HMD device 100 may display screen images corresponding to the respective playing time. As described above, the screen image may include a thumbnail image.

In this case, when the HMD device 100 displays a screen image prior to displaying the surround video image, the HMD device 100 may display a representative thumbnail image. In this case, the representative thumbnail image may be an image that is predetermined by a user or the processor 140. In addition, for example, the representative thumbnail image may be an image corresponding to a displayed region of the surround video image when the front direction of the HMD device 100 is a front direction of the user.

When the HMD device 100 displays a partial region of the surround video image and then displays a screen image, the HMD device 100 may display a viewing thumbnail image corresponding to a displayed partial region. That is, the HMD device 100 may set a viewing thumbnail image based on the displayed partial region of the surround video image and may selectively display the viewing thumbnail image.

Figure 5A:
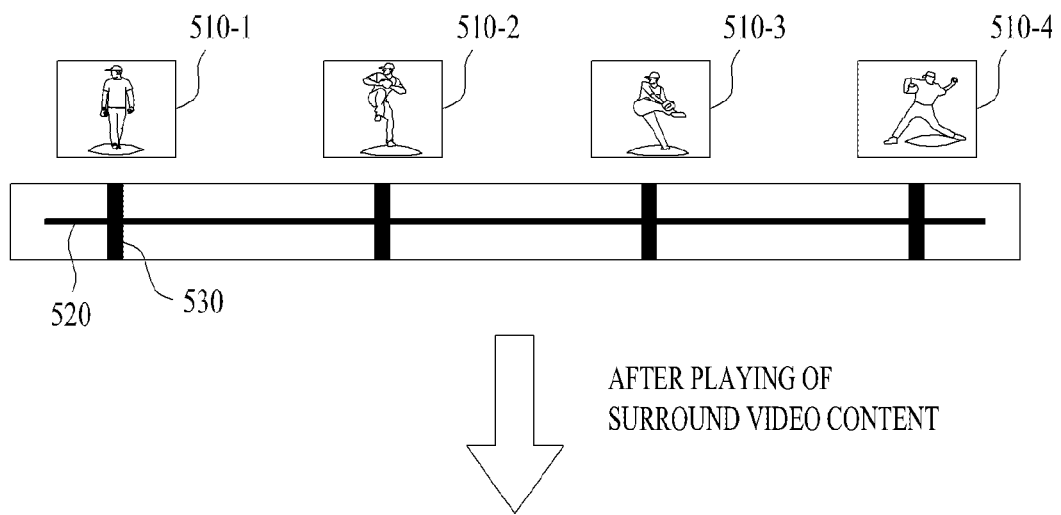
Figure 5A:
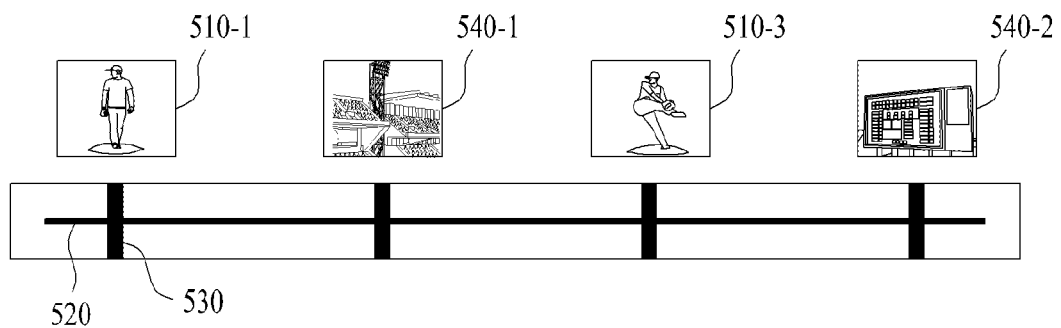

In this case, for example, referring to FIG. 5A, when the HMD device 100 displays a screen image prior to playing of the surround video content, the HMD device 100 may display representative thumbnail images 510-1, 510-2, 510-3, and 510-4 to correspond to playing time. In this case, the representative thumbnail images 510-1, 510-2, 510-3, and 510-4 may each be a thumbnail image corresponding to a displayed region of the surround video image when the front direction of the HMD device 100 is a reference direction. Then the HMD device 100 may play the surround video content and display a screen image. That is, the HMD device 100 may display surround video images corresponding to the respective playing time and display screen images.

The HMD device 100 may set a thumbnail image of the first surround video image at the first playing time as a representative thumbnail image 510-1. Then the HMD device 100 may display a partial region of the first surround video image, corresponding to a reference direction, at the first playing time. Then when the HMD device 100 displays the thumbnail image, the HMD device 100 may re-display the thumbnail image of the first surround video image, corresponding to the first playing time, as the representative thumbnail image 510-1. In more detail, the HMD device 100 may display the same representative thumbnail image 510-1 as a previous thumbnail image when the front direction of the HMD device 100 is hold to be the reference direction at the first playing time when the first surround video image is displayed.

In addition, the HMD device 100 may set a representative thumbnail image 510-2 of a second surround video image at a second playing time. Then the HMD device 100 may display a first viewing region that is displayed when the front direction of the HMD device 100 is in the first direction. Then when the HMD device 100 displays a thumbnail image of a second surround video image, corresponding to a second playing time, the HMD device 100 may display a viewing thumbnail image 540-1 corresponding to the first viewing region. That is, the HMD device 100 may change the thumbnail image of the second surround video image to the viewing thumbnail image 540-1 corresponding to the first viewing region of the representative thumbnail image 510-2, displayed at the second playing time, and display the thumbnail image. Through this, the HMD device 100 may provide information about a viewing region of each playing time in the surround video content, to the user.

Figure 5B:
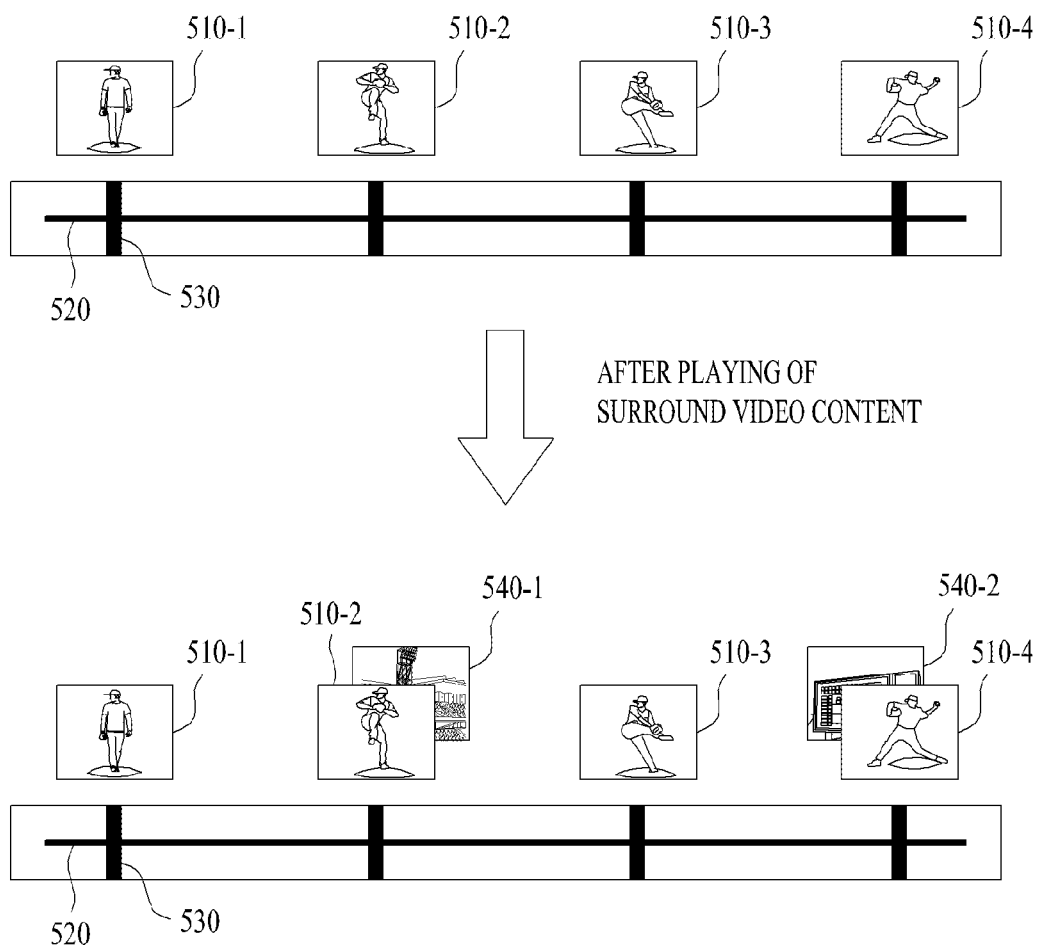

In addition, for example, referring to FIG. 5B, when the HMD device 100 plays the surround video content and then displays a screen image, the HMD device 100 may display both a representative thumbnail image and a viewing thumbnail image. For example, the HMD device 100 may detect the front direction of the HMD device 100 at the first playing time as the reference direction. In this case, the HMD device 100 may display only the representative thumbnail image 510-1 of the first surround video image as the thumbnail image. In addition, the HMD device 100 may detect the front direction of the HMD device 100 at the second playing time as the first direction and display the first viewing region based on the first direction. In this case, the HMD device 100 may display both the representative thumbnail image 510-2 of the second surround video image and the viewing thumbnail image 540-1 corresponding to the first viewing region.

In this case, for example, the HMD device 100 may overlap and display the representative thumbnail image 510-2 and the viewing thumbnail image 540-1. For example, the HMD device 100 may determine a position in which the viewing thumbnail image 540-1 is displayed, based on the representative thumbnail image 510-2. In more detail, when the front direction of the HMD device 100 is positioned at the right side based on the aforementioned reference direction, the HMD device 100 may display the viewing thumbnail image 540-1 corresponding to the front direction of the HMD device 100 at the right side of the representative thumbnail image 510-2. That is, the HMD device 100 may compare the front direction of the HMD device 100 and display a thumbnail image.

In addition, for example, referring to FIG. 5C, when the HMD device 100 displays a viewing thumbnail image, the HMD device 100 may further display an indicator. In this case, the indicator may be an indicator indicating that the front direction of the HMD device 100 is changed and a viewing region is changed. For example, the indicator may indicate a front direction of the HMD device 100 based on the reference direction.

In more detail, when the HMD device 100 displays the viewing thumbnail image 540-1 of the first surround video image, the HMD device 100 may further include an indicator 550-1. In this case, the indicator 550-1 may indicate that the representative thumbnail image 510-2 is changed to the viewing thumbnail image 540-1. In addition, the indicator may indicate a relative direction of the front direction of the HMD device 100 based on the reference direction. That is, the indicator may be an indicator indicating a relative position of the first viewing region.

Figure 5D:
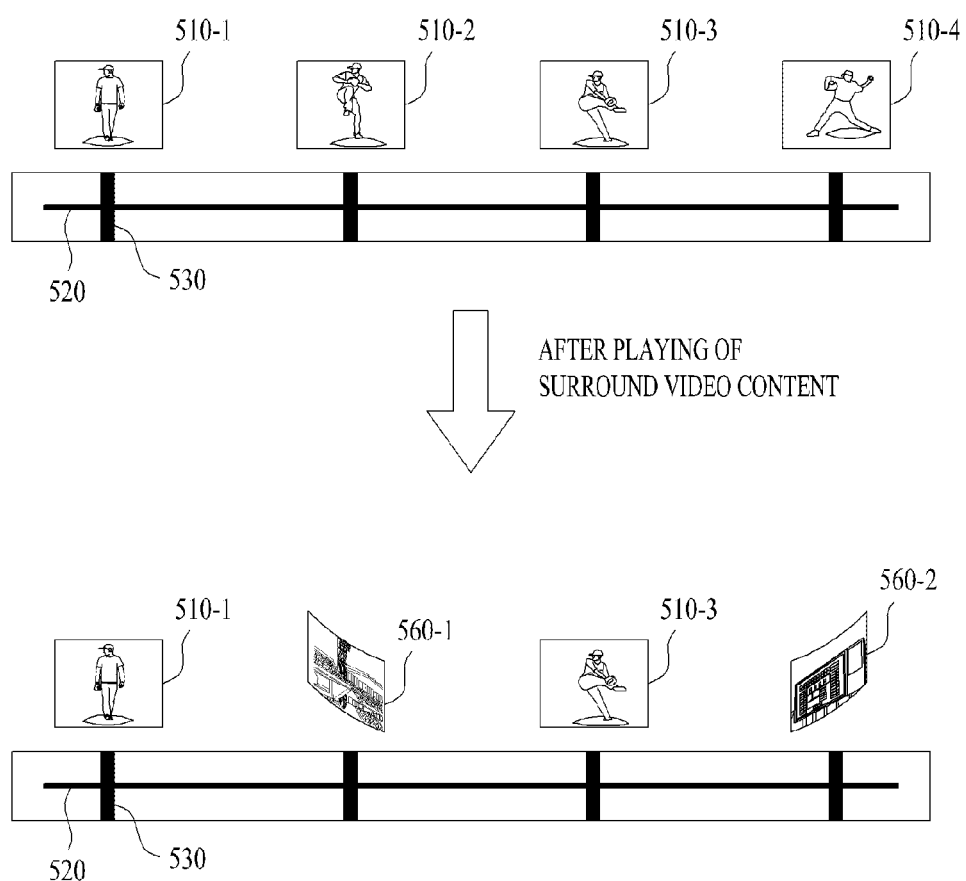

In addition, for example, referring to FIG. 5D, when the HMD device 100 plays surround video content and displays a viewing thumbnail image, the HMD device 100 may display the viewing thumbnail image based on image attributes of the viewing thumbnail image. In this case, the image attributes may be at least one of the size, shape, direction, and displayed position of the viewing thumbnail image. For example, the image attributes may be determined based on the front direction of the HMD device 100, corresponding to the viewing thumbnail image based on the aforementioned reference direction of the representative thumbnail image. That is, the HMD device 100 may determine the image attributes based on a relative position of the first viewing region in the surround video image. In more detail, when the HMD device 100 displays a viewing thumbnail image 560-1 of the first surround video image, the HMD device 100 may display the viewing thumbnail image 560-1 in consideration of a shape of the surround video image. That is, the HMD device 100 may display the viewing thumbnail image 560-1 in consideration of the relative position, size, and shape of the first viewing region based on a partial region of the first surround video image, corresponding to the representative thumbnail image 510-2.

As such, the HMD device 100 may allow the user to check a displayed partial region of the surround video image according to the front direction of the HMD device 100.

Figure 6A:
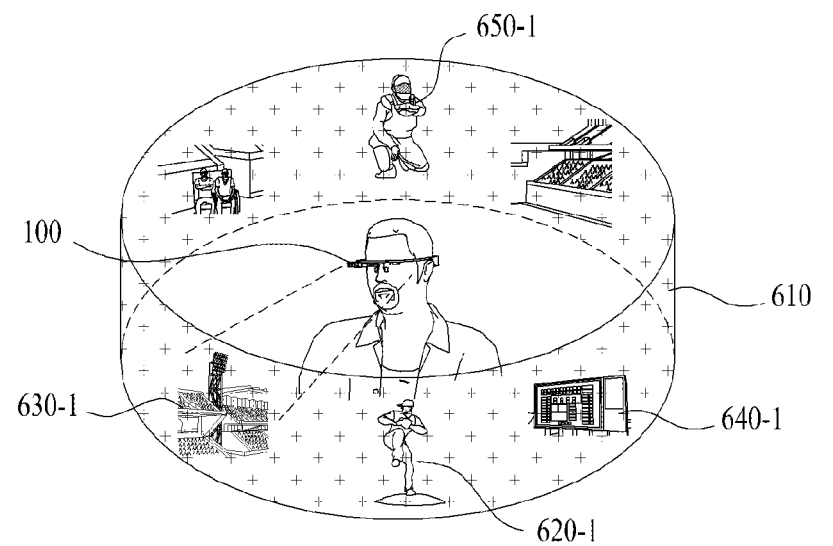
FIGS. 6A and 6B are diagrams illustrating a method of displaying a thumbnail image based on a front direction of an HMD device by the HMD device according to an embodiment of the present specification.
Figure 6A:
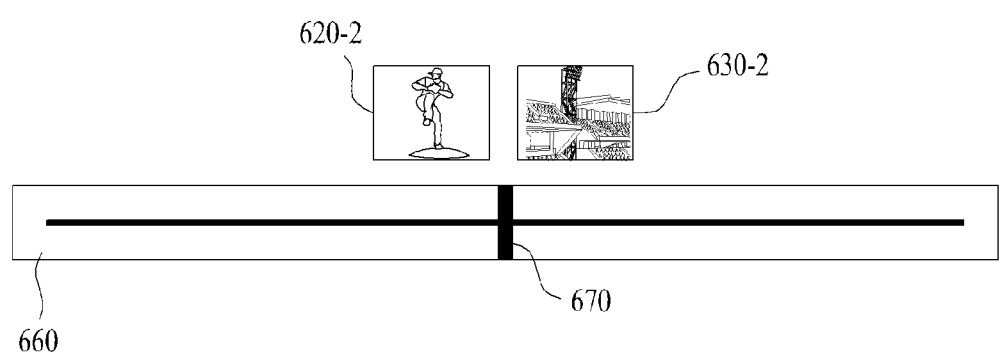
Figure 6B:
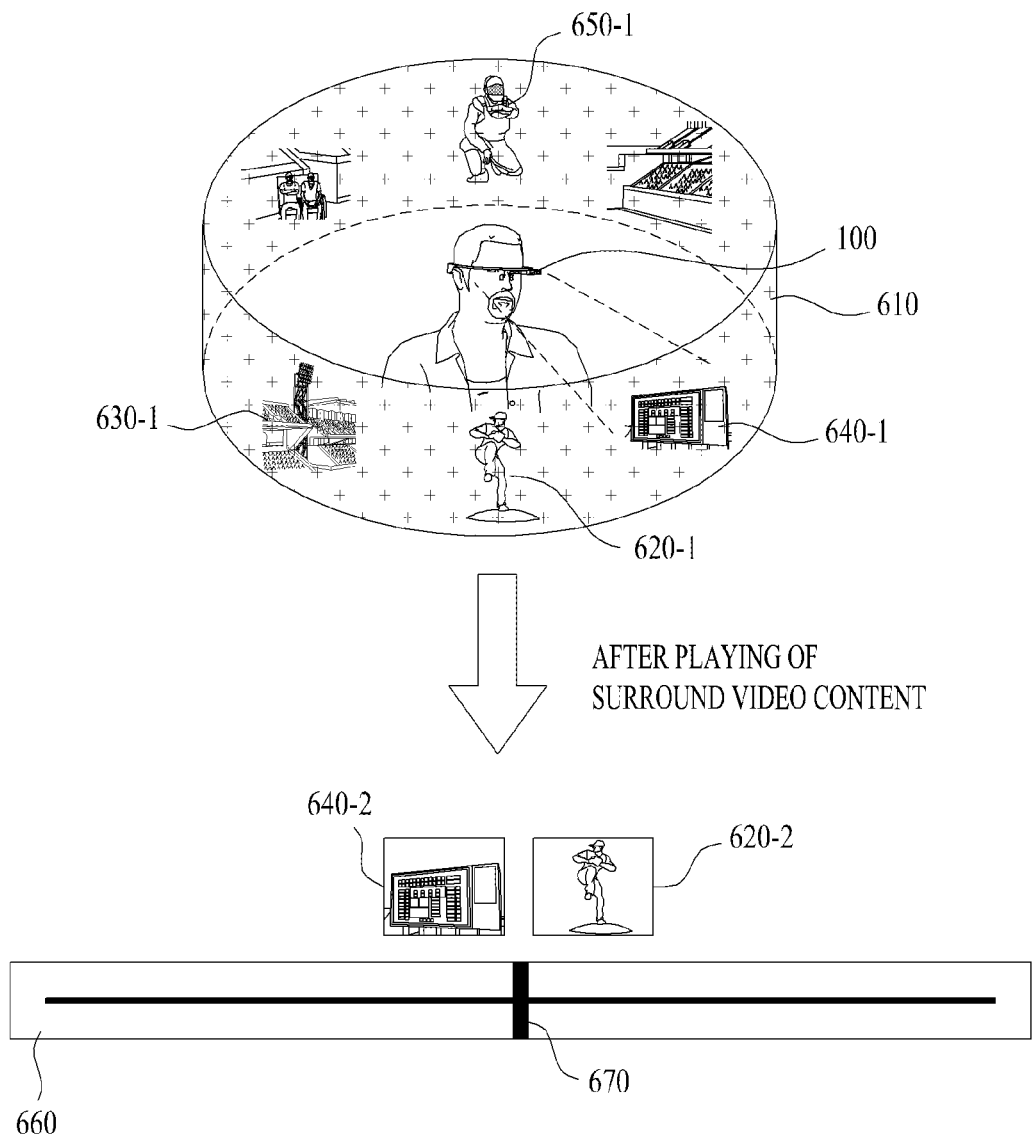

FIGS. 6A and 6B are diagrams illustrating a method of displaying a thumbnail image based on a front direction of the HMD device 100 by the HMD device 100 according to an embodiment of the present specification.

The HMD device 100 may set a representative thumbnail image 620-2 of a first surround video image 610 prior to playing of surround video content. In this case, the representative thumbnail image 620-2 may correspond to a first viewing region 620-1 of the first surround video image 610. In addition, the first viewing region 620-1 may be displayed when the front direction of the HMD device 100 is a front direction of a user or a reference direction. Then the HMD device 100 may play surround video content and set a viewing thumbnail image 630-2 of the first surround video image 610. In this case, the viewing thumbnail image 630-2 may correspond to a second viewing region 630-1 of the first surround video image 610. In addition, the second viewing region 630-1 may be positioned at the right side of the first viewing region 620-1. In this case, the first surround video image 610, the representative thumbnail image 620-2, and the viewing thumbnail image 630-2 may be images corresponding to the same first playing time.

When the HMD device 100 plays surround video content and displays a screen image, the HMD device 100 may display the representative thumbnail image 620-2 at a first position and display the viewing thumbnail image 630-2 at a second position. That is, the HMD device 100 may display both the representative thumbnail image 620-2 and the viewing thumbnail image 630-2. In this case, the HMD device 100 may determine the first position and the second position based on relative positions of the first viewing region 620-1 and the second viewing region 630-1. In more detail, the HMD device 100 may determine the first position and the second position based on a relative position of a front direction of the HMD device 100 corresponding to the first viewing region 620-1 and a front direction of the HMD device 100 corresponding to the second viewing region 630-1. In this case, the second viewing region 630-1 may be positioned at the right side of the first viewing region 620-1. Thus, the HMD device 100 may set the second position as the right side of the first position. That is, the HMD device 100 may display the viewing thumbnail image 630-2 at the right side based on the representative thumbnail image 620-2.

Referring to FIG. 6B, a second viewing region 640-1 may be positioned at the left side of the first viewing region 620-1. In this case, the HMD device 100 may display a viewing thumbnail image 640-2 at the left side based on the representative thumbnail image 620-2.

For example, a second viewing region 650-1 may be positioned at a complete opposite side of the first viewing region 620-1. In more detail, the HMD device 100 may display a region corresponding to an opposite direction to a reference direction or a front direction of a user, as the second viewing region 650-1. In this case, when the HMD device 100 displays a viewing thumbnail image (not shown) corresponding to the second viewing region, the HMD device 100 may overlap the viewing thumbnail image behind the representative thumbnail image 620-2 and display the viewing thumbnail image. In this case, for example, the representative thumbnail image 620-2 may be a transparent image. For example, the HMD device 100 may control positions for displaying the representative thumbnail image 620-2 and the viewing thumbnail image in consideration of a relative position of the first viewing region 620-1 and the second viewing region without being limited thereto.

Figure 7A:
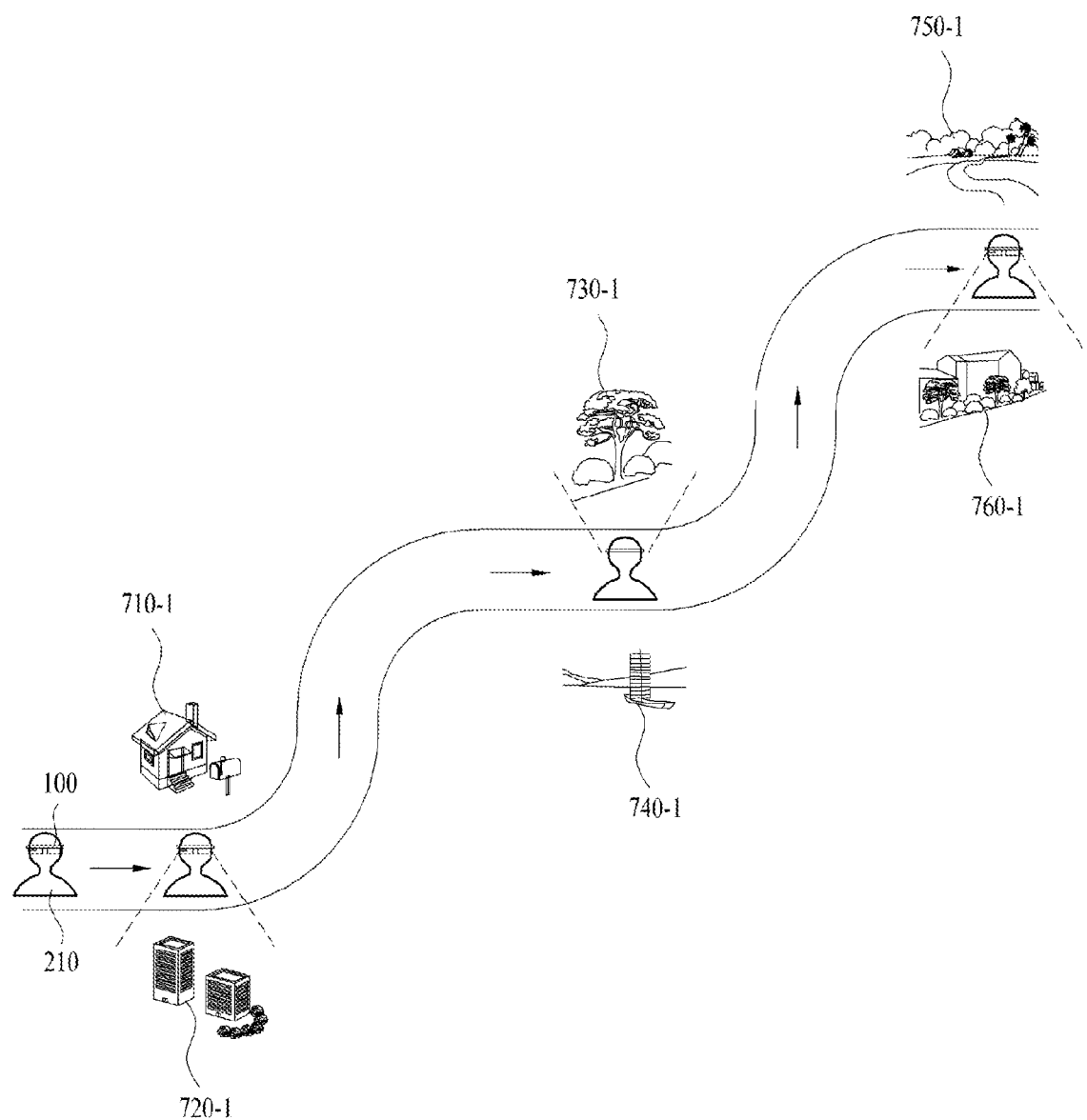
FIGS. 7A and 7B are diagrams illustrating a method of displaying a thumbnail image according to a moving path of an HMD device by the HMD device according to an embodiment of the present specification.
Figure 7B:
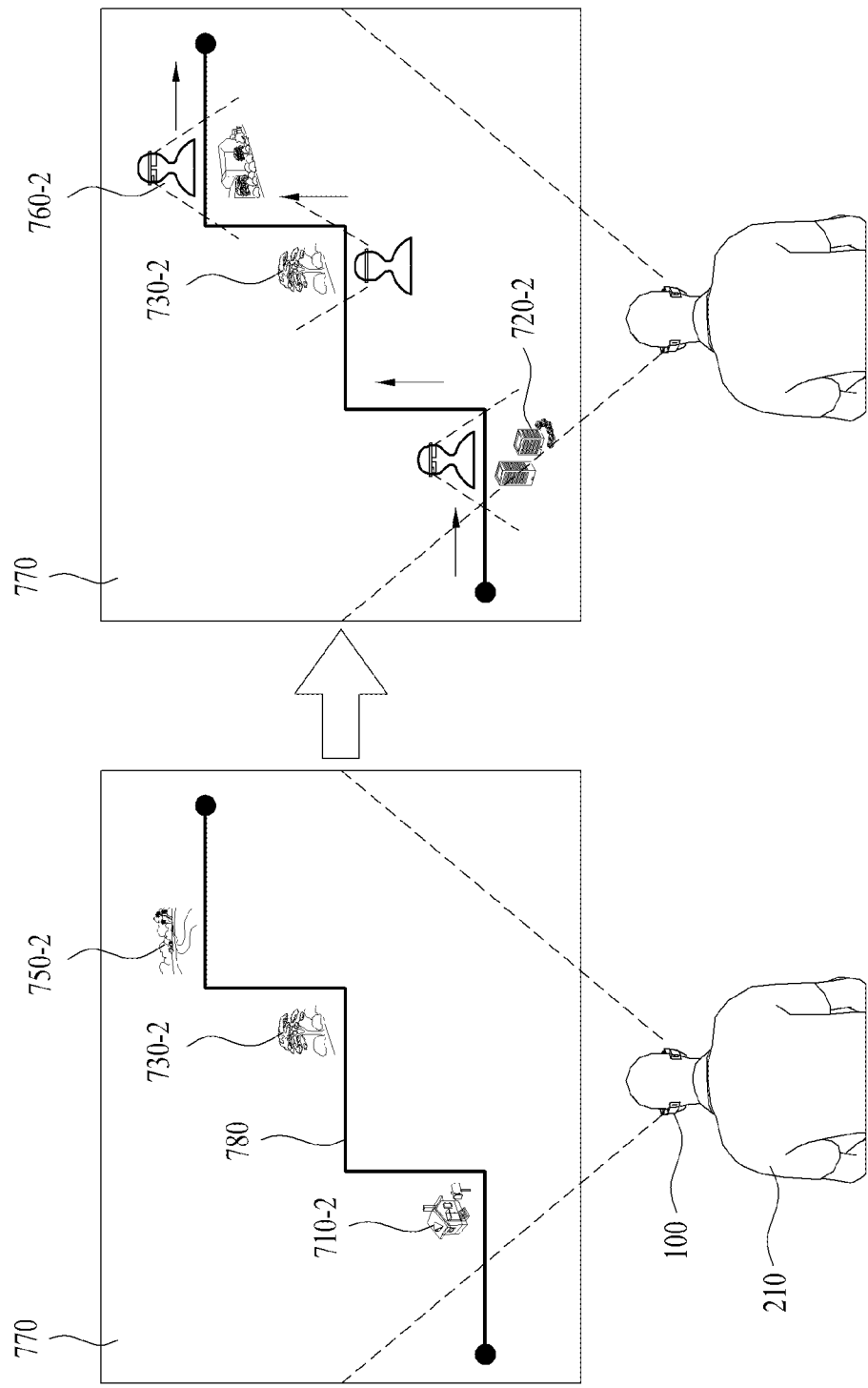

FIGS. 7A and 7B are diagrams illustrating a method of displaying a thumbnail image according to a moving path of the HMD device 100 by the HMD device 100 according to an embodiment of the present specification.

The HMD device 100 may display a screen image in consideration of a moving path of the user who wears the HMD device 100. The screen image may include a partial region of the surround video image, a thumbnail image, and a progress map. In this case, the surround video image may be a virtual image provided by the HMD device 100. For example, the surround video image may be a real image provided by the HMD device 100. In this case, the real image may be surrounding images of all directions based on the HMD device 100. In addition, the progress map may indicate a moving path of the HMD device 100. In this case, the moving path may be a path set by the user or the processor 140. In addition, for example, the moving path may be a path along which the user wearing the HMD device 100 moves once.

The HMD device 100 may set a first thumbnail image corresponding to the first viewing region of the first surround video image. In this case, the first thumbnail image may be a representative thumbnail image and may be set by the user or the processor 140.

For example, when the HMD device 100 moves the first position, the HMD device 100 may set an image obtained by recording the surrounding images of all directions based on the HMD device 100 at the first position, as the first surround video image. That is, the HMD device 100 may set a surrounding image at a specific position of the HMD device 100 as the first surround video image. In addition, for example, the first surround video image may be included in the surround video content. In this case, the surround video content may be obtained by recording surrounding images of all directions based on the HMD device 100 for a moving period of time along a moving path of the HMD device 100, containing the first position.

In addition, when the HMD device 100 moves the first position, if the front direction of the HMD device 100 is in a first direction, the HMD device 100 may set a displayed surrounding image as a first viewing region. In addition, when the front direction of the HMD device 100 is in a second direction, the HMD device 100 may set the displayed surrounding image as a second viewing region.

In this case, the HMD device 100 may set a first thumbnail image corresponding to a first viewing region of a first surround video image. Then the HMD device 100 may detect that the HMD device 100 is moved to a first position. In this case, upon detecting that the front direction of the HMD device 100 is in the second direction at the first position, the HMD device 100 may set a second thumbnail image corresponding to a second viewing region of the first surround video image. In this case, the first surround video image, the first thumbnail image, and the second thumbnail image may correspond to the same first position. That is, the HMD device 100 may set a thumbnail image of a specific position along a moving path of the HMD device 100.

In this case, for example, the HMD device 100 may display a thumbnail image adjacent to a position corresponding to a moving path in a progress map.

In addition, for example, referring to FIG. 7B, the HMD device 100 may display a screen image along a moving path of the HMD device 100. In this case, the screen image may display at least one of a partial region of a surround video image, a thumbnail image, and a progress map. In this case, the HMD device 100 may display a first thumbnail image 710-2 corresponding to the first surround video image adjacent to the first position of the moving path of the progress map. In this case, for example, the first thumbnail image 710-2 may be a representative thumbnail image. Then the HMD device 100 may detect that the HMD device 100 moves the first position along the moving path. In this case, the HMD device 100 may detect that the front direction of the HMD device 100 is in the second direction at the first position and display the second viewing region. Then the HMD device 100 may display a screen image along the moving path of the HMD device 100. In this case, the HMD device 100 may display a second thumbnail image 720-2 corresponding to the first surround video image at the first position of the moving path of the progress map. That is, the HMD device 100 may detect that a viewing region is changed in consideration of the front direction of the HMD device 100 at the first position and change and display a thumbnail image corresponding to the viewing region. In addition, for example, the HMD device 100 may simultaneously display the first thumbnail image 710-2 that is a thumbnail image before moving and the second thumbnail image 720-2 as a thumbnail image after moving without being limited thereto.

FIG. 8 is a flowchart of a method of controlling the HMD device 100 according to an embodiment of the present specification.

The HMD device 100 may detect a front direction of the HMD device 100 (S810). In this case, as described with reference to FIG. 1, the front direction of the HMD device 100 may be changed based on movement of a user who wears the HMD device 100 and determined based on the HMD device 100. In more detail, the front direction of the HMD device 100 may be a direction in which the user views an image while wearing the HMD device 100. In addition, the HMD device 100 may set a reference direction of the front direction of the HMD device 100. The HMD device 100 may detect that the front direction of the HMD device 100 is changed based on the reference direction. For example, when the user displays surround video images for move watching while wearing the HMD device 100, the HMD device 100 may set the front direction of the HMD device 100 at a point in time when the user displays the surround video image. In this case, when the user turns or moves his or her head, the HMD device 100 may detect that the front direction of the HMD device 100 is changed based on the reference direction. That is, the front direction of the HMD device 100 may be detected based on the reference direction. In addition, the reference direction may be set by the user or the HMD device 100 without being limited thereto.

Then upon detecting that the front direction of the HMD device 100 is in the first direction, the HMD device 100 may display a first region of the surround video image (S820). In addition, upon detecting that the front direction of the HMD device 100 is in the second direction, the HMD device 100 may display a second region of the surround video image (S830). As described with reference to FIGS. 2A to 2C, the HMD device 100 may display a partial region of the surround video image based on the front direction of the HMD device 100. In this case, surround images may be spread in a predetermined direction (e.g., forward, backward, left, right, upward, and downlink directions) based on the HMD device 100. In particular, the HMD device 100 may detect that a direction in which a user's face is directed as the front direction of the HMD device 100 and provide a surround image corresponding to the corresponding direction. That is, the HMD device 100 may display a partial region of the surround video image based on the front direction.

Then the HMD device 100 may set a first thumbnail image corresponding to a first viewing region of a first surround video image (S840). As described with reference to FIG. 1, the HMD device 100 may set the first thumbnail image as a representative image of the first surround video image. In this case, for example, the first viewing region may be displayed when the front direction of the HMD device 100 is a front direction of the user. For example, the first viewing region may be displayed when the front direction of the HMD device 100 is the aforementioned reference direction. In addition, the first viewing region may be a representative image of the first surround video image.

Then the HMD device 100 may display a second viewing region of the first surround video image at a first playing time (S850). As described with reference to FIG. 1, the first playing time may correspond to time information contained in the surround video content. When the surround video content is played, the processor 140 may display a second viewing region of the first surround video image at the first playing time. In this case, the second viewing region may be displayed based on the front direction of the HMD device 100.

Then the HMD device 100 may set a second thumbnail image corresponding to the second viewing region of the first surround video image (S860). As described with reference to FIG. 1, when the first surround video image displays the second viewing region at the first playing time, the processor 140 may set the second thumbnail image corresponding to the second viewing region. In this case, the aforementioned first thumbnail image and second thumbnail image may correspond to the same first playing time. In more detail, the HMD device 100 may set the first surround video image, the first thumbnail image, and the second thumbnail image to correspond to the same first playing time and may selectively display the first surround video image, the first thumbnail image, and the second thumbnail image.

Throughout this specification, FIGS. 1 to 8 have been separately described for convenience of description. However, it is obvious that an embodiment obtained by combining some features of FIGS. 1 to 8 is within the scope of the present specification. In addition, embodiments of the present specification can include a computer readable medium including program commands for executing operations implemented through various computers.

The HMD device 100 and a method of controlling the same according to the present specification are not limited to the configurations and methods of the above-described embodiments. That is, the above-described embodiments may be partially or wholly combined to achieve various modifications.

The HMD device 100 and a method of controlling the same according to the present specification can also be embodied as processor readable codes on a processor readable recording medium. The processor readable recording medium is any data storage device that can store data which can be thereafter read by a processor. Examples of the processor readable recording medium include read-only memory (ROM), random-access memory (RAM), magnetic tapes, floppy disks, optical data storage devices, carrier wave such as transmission via the Internet, etc. The processor readable recording medium can also be distributed over network coupled computer systems so that the processor readable code is stored and executed in a distributed fashion.

It will be apparent to those skilled in the art that various modifications and variations can be made in the present specification without departing from the spirit or scope of the specification. Thus, it is intended that the present specification covers the modifications and variations of this specification provided they come within the scope of the appended claims and their equivalents.

In addition, throughout this specification, both device and method specifications have been described. As necessary, the description of the device and method specifications may be applied supplementarily.

The present specification may provide an HMD device for displaying a thumbnail image and a method of controlling the HMD device.

According to the present specification, the HMD device may set a thumbnail image based on a displayed region of a surround video image.

According to the present specification, the HMD device may display a surround video image to correspond to a playing time in the surround video content.

According to the present specification, the HMD device may display a screen image including at least one of a partial region of the surround video image, a thumbnail image, and a progress bar.

According to the present specification, the HMD device may display a thumbnail image and an indicator.

According to the present specification, the HMD device may display a thumbnail image based on image attributes.

According to the present specification, the HMD device may display a partial region of the surround video image based on control input for selection of a thumbnail image.

According to the present specification, the HMD device may display a thumbnail image based on positional information of the HMD device.

In addition, according to the present specification, the HMD device may display a progress map indicating a moving path of the HMD device.

What is claimed is:

1. A head mounted display (HMD) device comprising:
    a sensor unit configured to detect a front direction of the HMD device;
    a display unit configured to display a first screen image including a partial region of a surround video image of a first playing time, a first representative thumbnail image of a first playing time, a second representative thumbnail image of a second playing time and a progress bar,
    wherein the partial region corresponds to the detected front direction of the HMD device at the first playing time, and the surround video image of the first playing time is included in a surround video content; and
    a processor configured to:
    set a first thumbnail image corresponding to a first partial region of the surround video image of the first playing time as the first representative thumbnail image of the first playing time; and
    set a second thumbnail image corresponding to a second partial region of a surround video image of the second playing time as the second representative thumbnail image of the second playing time, wherein the surround video image of the second playing time is included in the surround video content,
    wherein the processor is further configured to:
    when a third partial region of the surround video image of the first playing time is displayed instead of the first partial region at the first playing time, change the first representative thumbnail image of the first playing time to a third thumbnail image and maintain the second representative thumbnail image, and
    wherein the third thumbnail image corresponds to the third partial region of the surround video image of the first playing time.

2. The HMD device according to claim 1, wherein the surround video content comprises a plurality of surround video images; and
    wherein the processor is further configured to display each of the surround video images corresponding to a playing time in the surround video content.

3. The HMD device according to claim 1, wherein the processor is further configured to display the first thumbnail image as the first representative thumbnail image on the first screen image when the first screen image is displayed before the third partial region of the surround video image of the first playing time is displayed at the first playing time.

4. The HMD device according to claim 1, wherein the processor is further configured to display the third thumbnail image as the first representative thumbnail image when the first screen image is displayed after the third partial region of the surround video image of the first playing time is displayed at the first playing time.

5. The HMD device according to claim 4, wherein the processor is further configured to display a first indicator adjacent to the changed first representative thumbnail image when the first screen image is displayed; and
    wherein the first indicator indicates that the partial region is changed.

6. The HMD device according to claim 4, wherein the processor is further configured to display the changed first representative thumbnail image based on image properties of the third thumbnail image when the first screen image is displayed.

7. The HMD device according to claim 6, wherein the image properties are at least one of a size, a shape, a direction, and a displayed position of the third thumbnail image.

8. The HMD device according to claim 6, wherein the image properties are determined based on a relative position of the third partial region corresponding to the third thumbnail image with respect to the partial region corresponding to the first thumbnail image in the surround video image of the first playing time.

9. The HMD device according to claim 1, wherein the processor is further configured to display the first thumbnail image at a first position of the first screen image and the changed first representative thumbnail image at a second position of the first screen image when the first screen image is displayed after the third partial region of the surround video image of the first playing time is displayed.

10. The HMD device according to claim 9, wherein the processor is further configured to determine the first position and the second position based on a relative position of the third partial region corresponding to the third thumbnail image with respect to the first partial region corresponding to the first thumbnail image.

11. The HMD device according to claim 1, wherein the processor is further configured to overlap and display a portion of the first thumbnail image and a portion of the changed first representative thumbnail image in the first screen image when the first screen image is displayed after the second partial region of the first surround video image of the first playing time is displayed.

12. The HMD device according to claim 1, wherein the processor is further configured to, when at least one of the first thumbnail image and the changed first representative thumbnail image are displayed in the first screen image, display the at least one of the first thumbnail image and the changed first representative thumbnail image adjacent to a position corresponding to the first playing time in the progress bar.

13. The HMD device according to claim 1, wherein the first thumbnail image is an image formed by down-scaling the first partial region by a reference ratio,
    the second thumbnail image is an image formed by down-scaling the second partial region by the reference ratio, and
    the third thumbnail image is an image formed by down-scaling the third partial region by the reference ratio.

14. The HMD device according to claim 1, wherein the sensor unit is further configured to detect control input for selection of a thumbnail image; and
    wherein the processor is further configured to:
    if the first thumbnail image is displayed in the first screen image, display the first partial region of the first surround video image of the first playing time in the first screen image when first control input selecting the first thumbnail image is detected, and
    if the third thumbnail image is displayed in the first screen image, display the third partial region of the surround video image of the first playing time in the first screen image when second control input selecting the third thumbnail image is detected.

15. A head mounted display (HMD) device comprising:
    a sensor unit configured to detect a front direction of the HMD device;

a global positioning system (GPS) configured to detect positional information of the HMD device;
a display unit configured to display a first screen image including a partial region of a surround video image of a first playing time, a first representative thumbnail image of a first playing time, a second representative thumbnail image of a second playing time and a progress bar,
wherein the partial region corresponds to the detected front direction of the HMD at the first playing time and the surround video image of the first playing time is included in a surround video content; and
a processor configured to:
set a first thumbnail image corresponding to a first partial region of the surround video image of the first playing time as the first representative thumbnail image of the first playing time; and
set a second thumbnail image corresponding to a second partial region of a surround video image of the second playing time as the second representative thumbnail image of the second playing time,
the processor is further configured to:
detect that the HMD device is moved to a first position,
display a third partial region of the surround video image of the first playing time instead of the first partial region in the first screen image when the front direction of the HMD device is changed, and
after the third partial region of the surround video image of the first playing time is displayed at the first playing time, change the first representative thumbnail image of the first playing time to a third thumbnail image and maintain the second representative thumbnail image,
wherein the third thumbnail image corresponds to the third partial region of the surround video image of the first playing time.

16. The HMD device according to claim 15, wherein the surround video content is formed by recording surrounding images of all directions based on the HMD device for a period of time when the HMD device is moved along a moving path of the HMD device.

17. The HMD device according to claim 15, wherein the surround video image of the first playing time is formed by recording surrounding images of all directions based on the HMD device when the HMD device is moved to the first position;
the first partial region is a surrounding image displayed when the front direction of the HMD device is a first direction at the first position; and
the third viewing region is a surrounding image displayed when the front direction of the HMD device is a second direction at the first position.

18. A method of controlling a head mounted display (HMD) device, the method comprising:
sensing, via a sensor unit of the HMD, a front direction of the HMD;
displaying, via a display unit of the HMD, a first screen image including a partial region of a surround video image of a first playing time, a first representative thumbnail image of a first playing time, a second representative thumbnail image of a second playing time and a progress bar,
wherein the partial region corresponds to the detected front direction of the HMD device at the first playing time and the surround video image of the first playing time is included in a surround video content;
setting, via a processor of the HMD, a first thumbnail image corresponding to a first partial region of the surround video image of the first playing time as a first representative thumbnail image of the first playing time;
setting, via the processor, a second thumbnail image corresponding to a second partial region of the surround video image of the second playing time as the second representative thumbnail image of the second playing time; and
when a third partial region of the surround video image of the first playing time is displayed instead of the first partial region at the first playing time, changing the first representative thumbnail image of the first playing time to a third thumbnail image and maintaining the second representative thumbnail image,
wherein the third thumbnail image corresponds to the third partial region of the surround video image of the first playing time.

* * * * *